United States Patent [19]

Matsuda et al.

[11] Patent Number: 4,635,890
[45] Date of Patent: Jan. 13, 1987

[54] LOCK MECHANISM FOR ADJUSTABLE SEAT

[75] Inventors: Koichi Matsuda, Ebina; Nobuaki Kondo; Yuji Tanaka, both of Fujisawa, all of Japan

[73] Assignees: Nissan Motor Co., Ltd.; Ikeda Bussan Co., Ltd., both of Japan

[21] Appl. No.: 657,817

[22] Filed: Oct. 5, 1984

[30] Foreign Application Priority Data

Oct. 11, 1983 [JP] Japan .................. 58-188513

[51] Int. Cl.$^4$ ............................ F16M 13/00
[52] U.S. Cl. ................................. 248/429
[58] Field of Search ............... 248/429, 430, 420, 419, 248/424; 297/341, 340

[56] References Cited

U.S. PATENT DOCUMENTS

| | | | |
|---|---|---|---|
| 2,579,597 | 12/1951 | Moroney | 248/430 |
| 2,636,545 | 4/1953 | Johnson | 248/430 |
| 2,682,912 | 7/1954 | Johnson et al. | |
| 2,723,711 | 11/1955 | Duncan | 249/429 X |
| 3,258,240 | 6/1966 | Kirk | 248/429 X |
| 3,259,354 | 7/1966 | Dall | 248/429 |
| 3,582,033 | 6/1971 | LaFletche et al. | 248/430 |
| 4,497,518 | 2/1985 | Nishimura et al. | 297/341 |

*Primary Examiner*—Ramon O. Ramirez
*Attorney, Agent, or Firm*—Leydig, Voit & Mayer

[57] ABSTRACT

A seat is mounted on right and left slide rails slidable on right and left guide rails so that the position of the seat is adjustable back and forth. Right and left lock mechanisms are mounted on the right and left slide rails, respectively, for locking a relative movement between a right or left pair of the slide and guide rails. A handle bar is connected with the left lock mechanism, for example, and extends forwardly so that the left lock mechanism is unlocked with the handle bar. The motion of the handle bar for unlocking the left lock mechanism is transmitted through a release wire and link mechanism to the right lock mechanism to unlock the right lock mechanism together. The release wire extends from the handle bar adjacent the left slide rail to the right slide rail near the front of the seat. The link means extends backwardly along the right slide rail from the end of the release wire to the right lock mechanism. The link means makes it possible to displace the position of the right end of the release wire toward the front of the seat.

9 Claims, 10 Drawing Figures

LOCK MECHANISM FOR ADJUSTABLE SEAT

BACKGROUND OF THE INVENTION

The present invention relates to a mechanism for supporting a seat, such as a front seat of an automobile, in such a manner that the position of the seat is adjustable back and forth.

Such a seat support mechanism usually comprises right and left parallel guide rails, right and left slide rails slidable, respectively, on the two guide rails, and right and left lock mechanisms for locking a relative movement between a right or left pair of the guide and slide rails. A handle is connected with one of the right and left lock mechanisms so that it is unlocked by moving the handle. A release wire is connected between the handle and the other of the right and left lock mechanisms so that the other lock mechanism can be unlocked together by the movement of the handle. Each of the right and left lock mechanism is located about the middle of the mating slide rail. Therefore, the release wire is stretched under the seat from side to side about the middle between the front and rear ends of the seat. This position of the release wire is not desirable because the release wire of this position is liable to receive undesirable forces to cause malfunction of the lock mechanisms from the central portion of the seat which deflects downwardly to the most extent when an occupant sits on the seat, and from the toe of an occupant of a rear seat, and because the release wire of this position is liable to impair the comfort of the seat. If the right and left lock mechanisms are placed near the front end of the seat in order to place the release wire near the front end of the seat, then the right and left guide rails would have to be lengthened.

SUMMARY OF THE INVENTION

It is an object of the present invention to provide a seat support mechanism for supporting a seat in such a manner that the position of the seat is adjustable back and forth in which the release wire can be placed near the front of the seat without changing the positions of the lock mechanisms.

According to the present invention, a seat support mechanism for supporting a seat in such a manner that the position of the seat is adjustable back and forth, comprises first and second parallel guide rails, first and second slide means which are slidable on the first and second guide rails, respectively, in forward and backward directions and which are adapted to support the seat under the seat, first and second lock means for locking and unlocking a first pair of the first guide and slide rails and a second pair of the second guide and slide rails, respectively, an operating bar, and motion transmitting means. The operating bar extends from a rear end to a front end in the forward direction. The rear end of the operating bar is connected with the first lock mechanism so that the first lock means can be moved into an unlock position with the operating bar. The motion transmitting means is connected between the operating bar and the second lock means for transmitting motion from the operating bar to the second lock means so that the second lock means can be moved to an unlock position together with the first lock means with the operating bar. The motion transmitting means comprises a wire extending along a line crossing the first and second guide rails and having a first end connected with the operating bar at an intermediate position between the front and rear ends of the operating bar, and a second end. The motion transmitting means further comprises link means extending along the longitudinal line of the second guide rail and having a front end connected with the second end of the wire, and a rear end located away from the front end of the link means in the backward direction and connected with the second lock means.

DETAILED DESCRIPTION OF THE INVENTION

Figure 1:
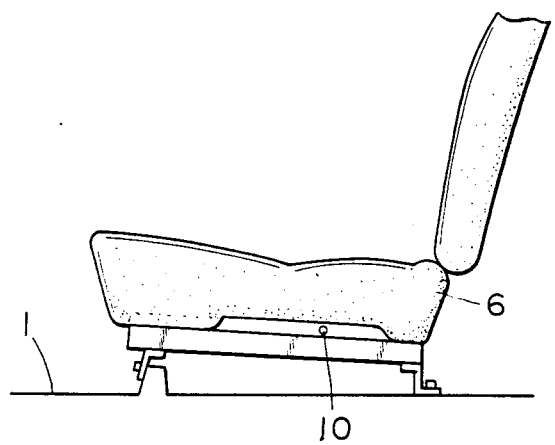
FIG. 1 is a side view of a seat and its support mechanism of a conventional type.
Figure 2:
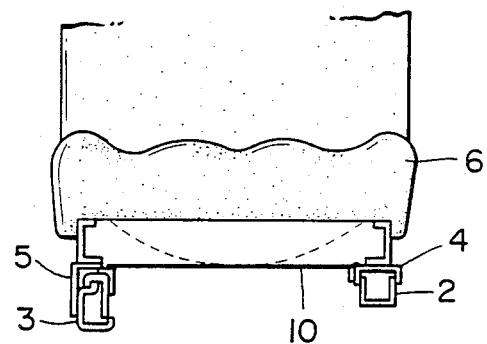
FIG. 2 is a front view of the seat and its support mechanism of FIG. 1.
Figure 4:
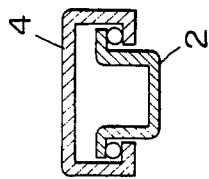
FIG. 4 is a sectional view taken across a line IV—IV of FIG. 3.
Figure 3:
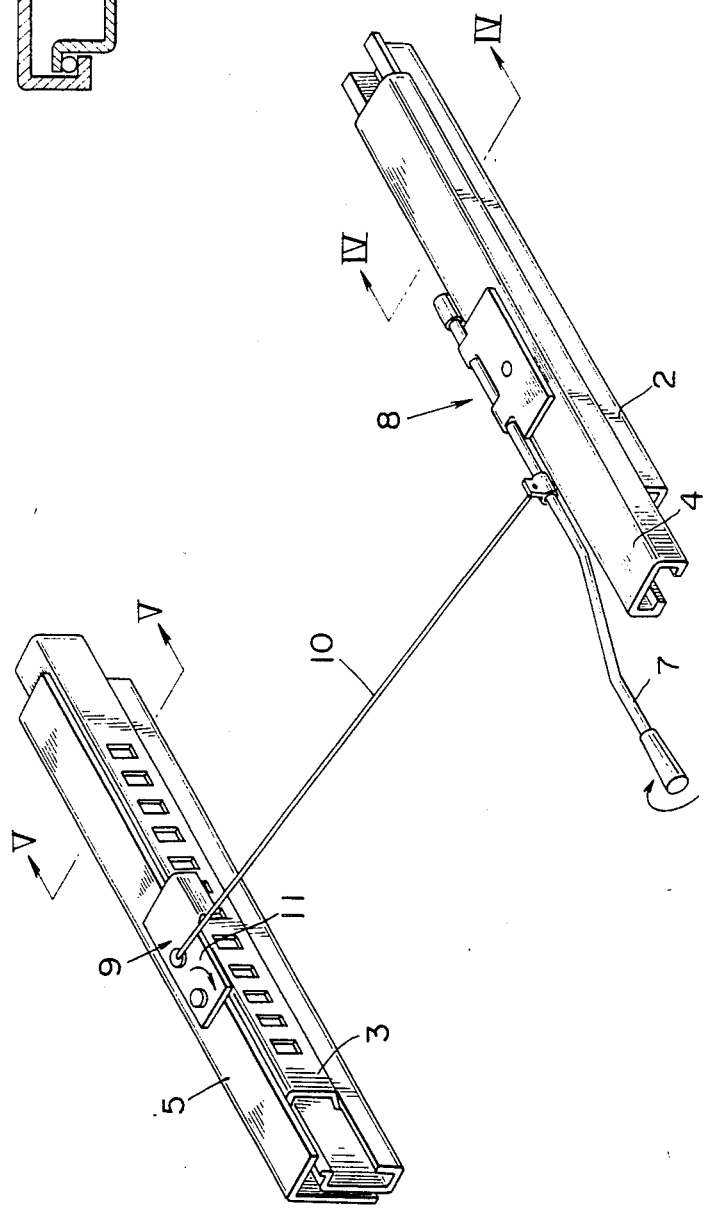
FIG. 3 is a perspective view of the seat support mechanism of FIG. 1.
Figure 5:
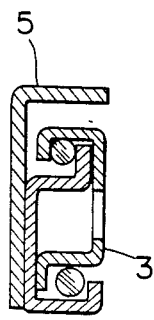
FIG. 5 is a sectional view taken across a line V—V of FIG. 3.

FIGS. 1 to 5 show an adjustable seat support mechanism of one conventional type for a vehicle. In this mechanism, a pair of guide rails 2 and 3 are fixed on a generally horizontal front floor 1 of the vehicle. The guide rails 2 and 3 extend along the longitudinal line of the vehicle. Two slide rails 4 and 5 are mounted on the guide rails 2 and 3, respectively, in such a manner that the slide rails 4 and 5 are slidable toward the front and rear ends of the vehicle. A seat 6 is mounted on and fixed to the slide rails 4 and 5. A first lock mechanism 8 is mounted on the slide rail 4 on the inboard side. A handle 7 of a bar shape is connected with the first lock mechanism 8. A second lock mechanism 9 is mounted on the slide rail 5 on the outboard side. The handle 7 is connected with a lock plate 11 of the second lock mechanism through a release wire 10. When the handle 7 is rotated in a direction shown by an arrow in FIG. 3, a lock plate of the first lock mechanism 8 is swung and the first lock mechanism 8 is unlocked. At the same time, the lock plate 11 of the second lock mechanism 9 is swung in a direction shown by an arrow in FIG. 3 through the release wire 10, and accordingly the second lock mechanism 9 is unlocked.

In this mechanism, the first lock mechanism 8 is placed in the middle of the longitudinal length of the slide rail 4, and the second lock mechanism 9 is placed in the middle of the longitudinal length of the slide rail 5. Therefore, the release wire 10 extends from the right side to the left side of the seat in the middle of the seat between the front and rear ends. When a heavy occupant sits on the seat, the bottom of the seat deflects downwardly as shown by a broken line in FIG. 2. Therefore, the release wire 10 of the middle position is liable to be pushed down by the seat bottom. There is a strong demand for a solution of this problem especially because of a recent tendency toward lowering vehicle seats in order to improve comfort.

Figure 6:
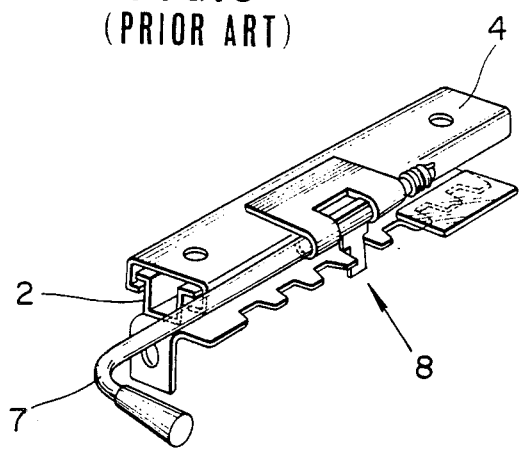
FIG. 6 is a perspective view of a lock mechanism which can be used as a lock mechanism shown in FIG. 3.
Figure 7:
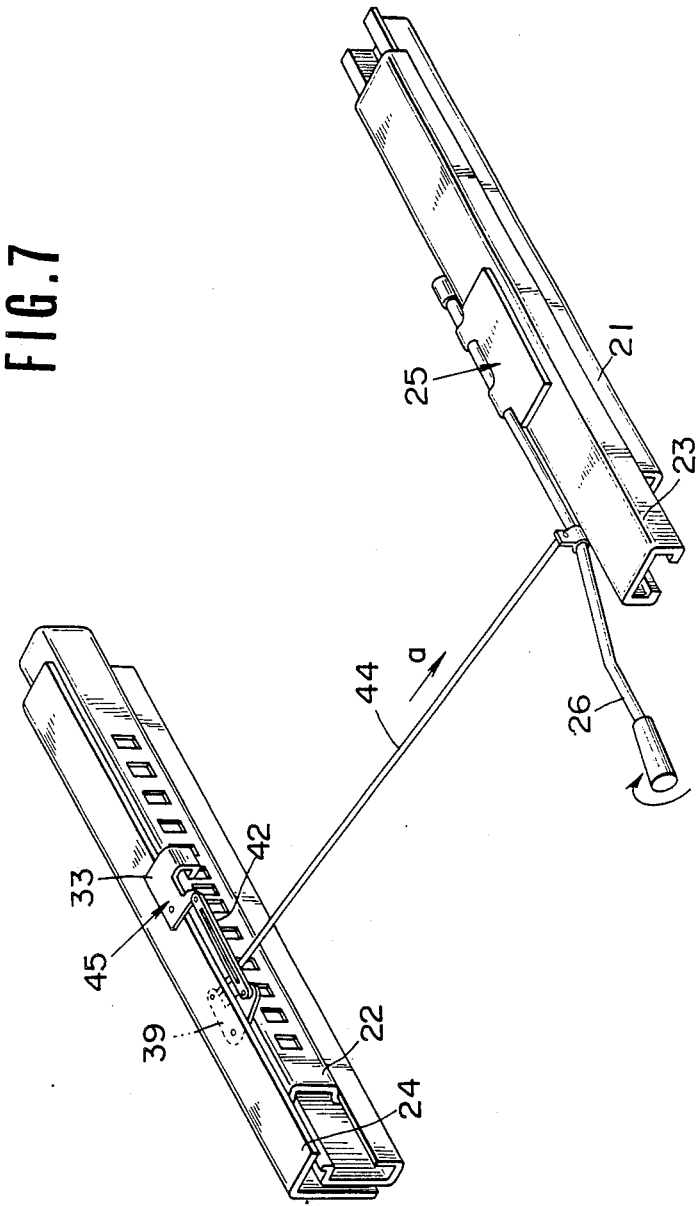
FIG. 7 is a perspective view of a seat support mechanism according to the present invention.
Figure 8:
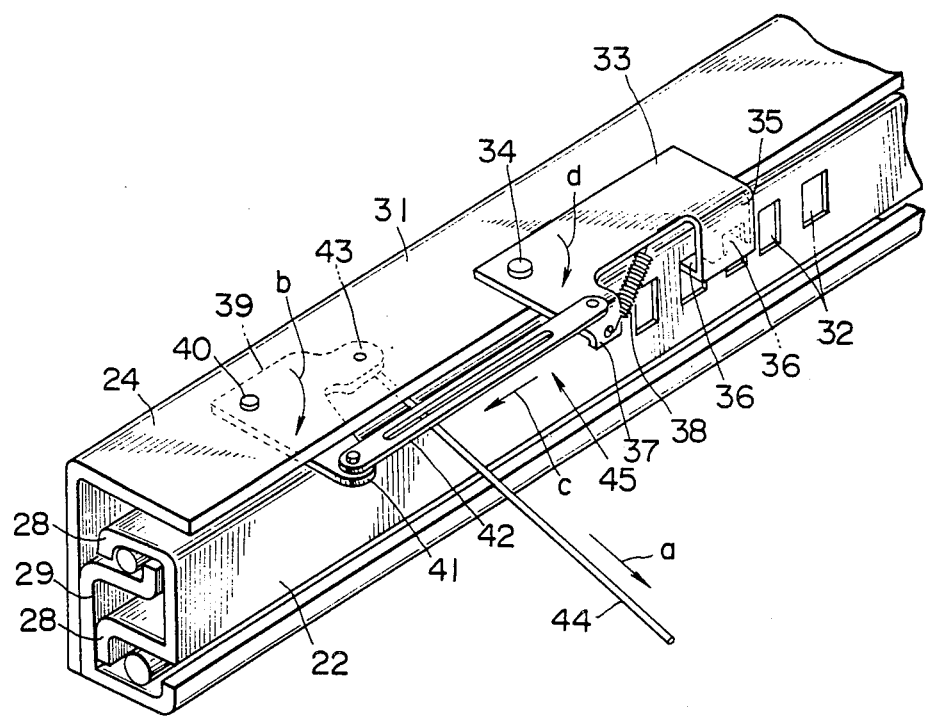
FIG. 8 is an enlarged perspective view showing an outer lock mechanism shown in FIG. 6.

FIG. 6 shows one construction of guide and slide rails, a lock mechanism and a handle, which can be used as the inboard guide and slide rails 2 and 4, the first lock mechanism 8 and the handle 7.

FIGS. 7, 8, 9A and 9B show one embodiment of the present invention in which the invention is applied to a front seat of a vehicle such as a motor vehicle. A seat system shown in FIGS. 7 to 9B has inner and outer guide rails 21 and 22 which extend in parallel with each other along a longitudinal line of the vehicle. The inner and outer guide rails 21 and 22 are fixed to a floor of the vehicle. The inner guide rail 21 is located inboard, and the outer guide rail 22 is located outboard. An inner slide rail 23 is mounted on the inner guide rail 21, and slidable along the inner guide rail 21. An outer slide rail 24 is mounted on the outer guide rail 22, and slidable along the outer guide rail 22. A seat assembly (not shown in FIGS. 7 to 9B) is mounted on and fixed to the inner and outer slide rails 23 and 24. Accordingly, a unit of the seat assembly and the inner and outer slide rails 23 and 24 is slidable, toward the front and rear of the vehicle, on the inner and outer guide rails 21 and 22.

An inner lock mechanism 25 is fixed to the inner slide rail 23. An operating bar 26 is connected with the inner lock mechanism 25. The operating bar 26 extends from the inner lock mehanism 25 toward the front of the seat along the inner slide rail 23. The inner lock mechanism 25 can be unlocked by moving the operating bar 26 manually. The inner lock mechanism 25 may take the form shown in FIG. 6.

The outer guide rail 22 has a C-shaped cross section opening toward the outboard side. Two edges 28 of the outer guide rail 22 extending longitudinally are bent downwardly. The outer slide rail 24 is fixed to a slide frame 29 extending along the outer slide rail 24. The slide frame 29 has a C-shaped cross section, and opens toward the center line of the vehicle. Two edges 30 of the slide frame 29 extending longitudinally are bent upwardly. The bent edges 28 of the outer guide rail 22 are engaged with the upturned bent edges 30 of the slide frame 29, respectively, in such a manner that the slide frame 29 and the outer slide rail 24 can slide along the outer guide rail 22. The cross section of the outer slide rail 24 has the shape of the letter L turned upside down. A top board portion 31 of the outer slide rail 24 is spaced from the top surface of the outer guide rail 22. The outer guide rail 22 has a vertical portion which faces toward the inner guide rail 21. The vertical portion of the outer guide rail 22 is formed with a plurality of lock holes 32 aligned in parallel to the longitudinal line of the vehicle at regular intervals.

A lock plate 33 is pivotally mounted on the top board portion 31 of the outer slide rail 24 about the middle of the longitudinal length of the outer slide rail 24. The lock plate 33 is swingable on a pivot axis 34 supported by the top board portion 31 of the outer slide rail 24, in a generally horizontal plane over the top board portion 31. The lock plate 33 has a bent arm 35 extending downwardly along the vertical portion of the outer guide rail 22. The bent arm 35 of the lock plate 33 has two lock claws 36 which can engage with two successive lock holes 32, respectively, at the same time, thus providing an outer lock means or mechanism 45 for the outer slide rail 24. The lock plate 33 has a second arm 37 extending toward the inner guide rail 21 beyond the edge of the top board portion 31. A spring 38 is disposed between the second arm 37 of the lock plate 33 and the outer slide rail 24. The spring 38 exerts a force which rotates or tends to rotate the lock plate 33 in a direction to engage the lock claws 32 with the lock holes 32. Accordingly, the spring 38 normally holds the lock plate 33 in a lock position where the lock claws 36 are engaged with the lock holes 32.

For imparting motion to the outer lock mechanism 45, a link means is provided including a lever 39 and a connecting member 42. The lever 39 of a bell crank type is pivotally mounted on the outer slide rail 24 through a pivot axis 40 under the top board portion 31 in front of the lock plate 33. The lever 39 has a first arm 41 and a second arm 43. The first arm 41 of the lever 39 extends toward the inner guide rail 21 beyond the edge of the top board portion 31 of the outer slide rail 24. The end of the first arm 41 of the lever 39 is connected with a a front end of the connecting member 42 of the link means. The member 42 extends backwardly from the front end to a rear end, which is connected with the end of the second arm 37 of the lock plate 33. The second arm 43 of the lever 39 lies under the top board portion 31 of the outer slide rail 24, and is connected with an outer end of a release wire 44. The release wire 44 extends from the outer end toward the inner slide rail 23. An inner end of the release wire 44 is connected with the operating bar 26 at a position lying in front of the inner lock mechanism 25. The wire 44 is stretched near the front end of the seat.

Figure 9A:
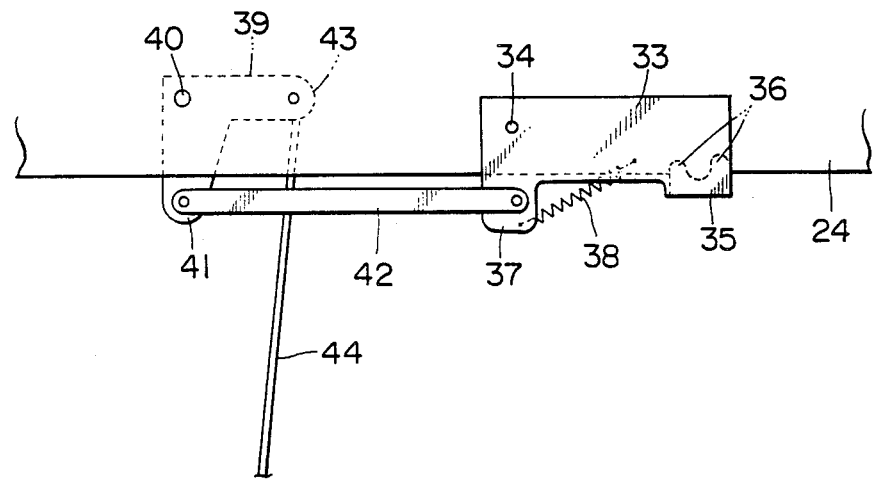
FIGS. 9A and 9B are illustrations for showing the operations of the seat support system of FIG. 6.
Figure 9B:
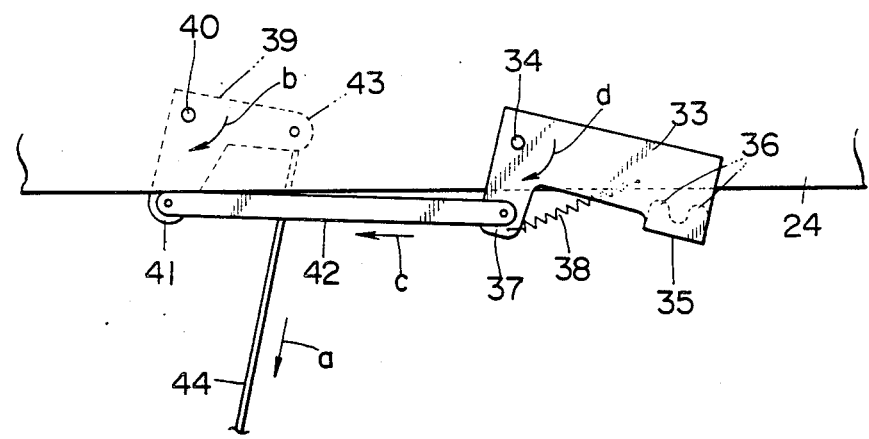

The position of this seat is adjusted as follows: When the operating bar 26 is rotated in a direction shown by an arrow in FIG. 7, the inner lock mechanism 25 is unlocked so that the inner slide rail 23 becomes slidable relative to the inner guide rail 21. At the same time, the release wire 44 is pulled in a direction shown by an arrow a toward the inner guide slide rail 23 by the operating bar 26. Accordingly, the second arm 43 of the lever 39 is pulled by the release wire 44, and the lever 39 rotates about the pivot axis 40 in a direction shown by an arrow b. This rotational motion of the lever 39 causes the member 42 to move forwardly in a direction shown by an arrow c. Consequently, the lock plate 33 is rotated about the pivot axis 34 in a direction shown by an arrow d against the force of the spring 38 by the member 42. Thus, the lock claws 36 of the lock plate 33 move away from the lock holes 32 of the outer guide rail, and the lock plate 33 of an outer lock mechanism 45 is put in an unlock position to allow the outer slide rail 24 to slide relative to the outer guide rail 22, as shown in FIG. 9B. While the inner and outer lock mechanisms 25 and 45 are held in the unlock position, the unit of the seat and the inner and outer slide rails 23 and 24 is slidable on the inner and outer guide rails 21 and 22 forwardly and backwardly of the seat, so that the seat occupant can select a desired position.

When the operating bar 26 is released, the restoring force of the spring 38 causes the lock plate 33 to rotate about the pivot axis 34 in a direction opposite to the direction d, so that the lock claws 36 engages with some successive two lock holes 32, and the lock plate 33 is restored to the lock position. This rotational motion of the lock plate 33 pulls the link 42 backwardly, rotates the lever 39 in the direction opposite to the direction b, and pulls the release wire 44 toward the outer slide rail 24, as shown in FIG. 9A. Therefore, the inner lock mechanism is moved into the lock position.

What is claimed is:

1. A seat support mechanism for supporting a seat so that the position of the seat is adjustable back and forth, comprising:

first and second parallel guide rails, first slide means slidable on said first guide rail in forward and backward directions, and second slide means slidable on said second guide rail in the forward and backward directions, said first and second slide means being adapted to support the seat under the seat so that the seat is slidable along said first and second guide rails in the forward and backward directions, first lock means which locks said first slide means so that said first slide means is not slidable relative to said first guide rail when said first lock means is in a lock position, and unlocks said first slide means so that said first slide means is slidable relative to said first guide rail when said first lock means is in an unlock position, second lock means which locks said second slide means so that said slide means is not slidable relative to said second guide rail when said second lock means is in a lock position, and unlocks said second slide means so that said second slide means is slidable relative to said second guide rail when said second lock means is in an unlock position, an operating bar extending from a rear end to a front end in the forward direction, said rear end of said operating bar being connected with said first lock means so that said first lock means can be moved to the unlock position with said operating bar, and motion transmitting means, connected between said operating bar and said second lock means, for transmitting motion from said operating bar to said second lock means so that said second lock means is moved to the unlock position together with said first lock means with said operating bar, said motion transmitting means comprising a wire extending along a line crossing said first and second guide rails, and having a first end connected with said operating bar at an intermediate position between said front and rear ends of said operating bar, and a second end, and link means extending along the longitudinal line of said second guide rail and having a front end connected with said second end of said wire, and a rear end located away from said front end of said link means in the backward direction and connected with said second lock means.

2. A seat support mechanism according to claim 1, wherein said first lock means and said operating bar are mounted on said first slide means, and said second lock means and said link means are mounted on said second slide means.

3. A seat support mechanism according to claim 2, wherein said first slide means comprises a first slide rail extending from a rear end to a front end in the forward direction, and said second slide means comprises a second slide rail extending from a rear end to a front end in the forward direction, said first lock means being fixed to said first slide rail at an intermediate position between said front and rear ends of said first slide rail, said second lock means being fixed to said second slide rail at an intermediate position between said front and rear ends of said second slide rail.

4. A seat support mechanism according to claim 3, wherein said link means comprises a bell crank pivotally supported on said second slide rail at a position closer to said front end of said second slide rail than said second lock means, said bell crank being swingable in a plane substantially parallel to both of the longitudinal lines of said first and second guide rails, said bell crank having a first arm and a second arm which is connected with said second end of said wire, said link means further comprising a connecting member extending from a rear end to a front end in the forward direction, said front end of said member being connected with said first arm of said bell crank and said rear end of said link being connected with said second lock means.

5. A seat support mechanism according to claim 4, wherein said first and second lock means are capable of locking said first and second slide means, respectively, to the longitudinal lines of said first and second guide rails.

6. A seat support mechanism according to claim 5, wherein said second lock means comprises a lock plate having a first arm having at least one claw for engaging with said second guide rail, and a second arm connected with said rear end of said link means by said connecting member, said lock plate being pivotally mounted on said second slide rail.

7. A seat support mechansim according to claim 6, wherein said second lock means further comprises biasing means disposed between said lock plate and said second slide rail for urging said lock plate toward said lock position of said second lock means where said claw of said lock plate engages with said second guide rail.

8. A seat support mechanism according to claim 7, wherein said second guide rail has a vertical portion which is generally vertical and extends over the full longitudinal length of said second guide rail, said vertical portion of said second guide rail being formed with a plurality of holes aligned in the longitudinal line of said second guide rail, and wherein said second slide rail has a horizontal portion which is generally horizontal and located above said vertical portion of said second guide rail, said lock plate being supported on said horizontal portion of said second slide rail so that said lock plate is swingable about a pivot axis perpendicular to said horizontal portion of said second slide rail, said first arm of said lock plate projecting beyond the edge of said horizontal portion of said second slide rail and extending downwardly along said vertical portion of said second guide rail, said claw of said first arm of said lock plate being capable of engaging with any one of said holes of said second guide rail.

9. A seat support mechanism according to claim 8, wherein said horizontal portion of said second slide rail is spaced from the top surface of said second guide rail, said bell crank being located under said horizontal portion of said second slide rail.

* * * * *